United States Patent
Mercadier

(10) Patent No.: US 10,167,225 B2
(45) Date of Patent: Jan. 1, 2019

(54) SUBSTRATE PROVIDED WITH A STACK HAVING THERMAL PROPERTIES AND A SUBSTOICHIOMETRIC INTERMEDIATE LAYER

(71) Applicant: SAINT-GOBAIN GLASS FRANCE, Courbevoie (FR)

(72) Inventor: Nicolas Mercadier, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/515,453

(22) PCT Filed: Sep. 29, 2015

(86) PCT No.: PCT/FR2015/052589
§ 371 (c)(1),
(2) Date: Mar. 29, 2017

(87) PCT Pub. No.: WO2016/051068
PCT Pub. Date: Apr. 7, 2016

(65) Prior Publication Data
US 2017/0240463 A1 Aug. 24, 2017

(30) Foreign Application Priority Data
Sep. 30, 2014 (FR) ...................... 14 59256

(51) Int. Cl.
*C03C 17/36* (2006.01)
*B32B 3/08* (2006.01)
(Continued)

(52) U.S. Cl.
CPC .............. *C03C 17/366* (2013.01); *B32B 3/08* (2013.01); *B32B 17/06* (2013.01); *C03C 17/36* (2013.01);
(Continued)

(58) Field of Classification Search
CPC ... C03C 17/366; C03C 17/36; C03C 17/3618; C03C 17/3626; C03C 17/3639;
(Continued)

(56) References Cited

U.S. PATENT DOCUMENTS 9,656,346 B2 * 5/2017 Yeh ..................... B23K 37/0235
9,708,215 B2 * 7/2017 Gerardin ................. C03C 17/36
(Continued)

FOREIGN PATENT DOCUMENTS

WO WO 2007/101964 A1 9/2007
WO WO 2009/122090 A2 10/2009
(Continued)

OTHER PUBLICATIONS

International Search Report dated Dec. 18, 2015 in PCT/FR2015/052589 filed Sep. 29, 2015.

*Primary Examiner* — William R Alexander
(74) *Attorney, Agent, or Firm* — Oblon, McClelland, Maier & Neustadt, L.L.P.

(57) ABSTRACT

A substrate is coated on one face with a thin-films stack having reflection properties in the infrared and/or in solar radiation including a single metallic functional layer, based on silver or on a metal alloy containing silver, and two antireflection coatings. The coatings each include at least one dielectric layer. The functional layer is positioned between the two antireflection coatings. At least one of the antireflection coatings includes an intermediate layer including zinc tin oxide $Sn_xZn_yO_z$ with a ratio of $0.1 \le x/y \le 2.4$, with $0.75(2x+y) \le z \le 0.95(2x+y)$ and having a physical thickness of between 2 nm and 25 nm, or even between 2 nm and 12 nm.

20 Claims, 1 Drawing Sheet

Figure 1:
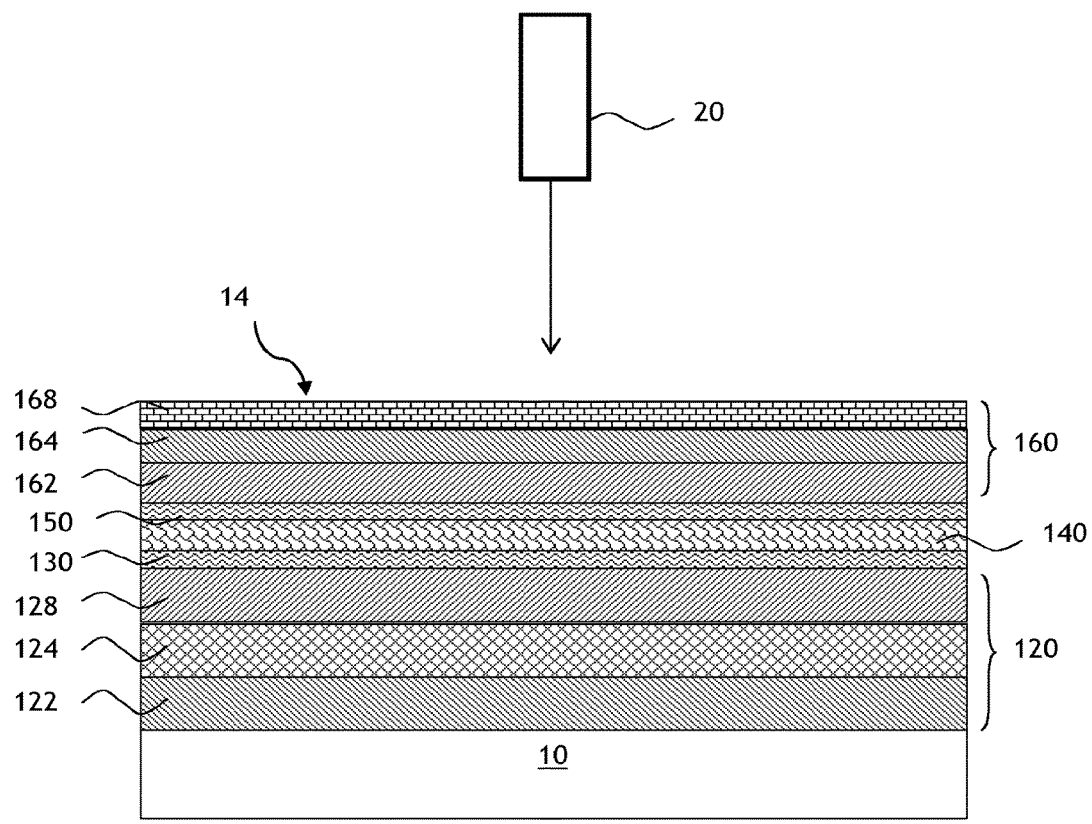

(51) Int. Cl.
*B32B 17/06* (2006.01)
*G02B 1/115* (2015.01)
*G02B 5/08* (2006.01)

(52) U.S. Cl.
CPC ...... *C03C 17/3618* (2013.01); *C03C 17/3626* (2013.01); *C03C 17/3639* (2013.01); *C03C 17/3642* (2013.01); *C03C 17/3644* (2013.01); *C03C 17/3649* (2013.01); *C03C 17/3652* (2013.01); *C03C 17/3673* (2013.01); *C03C 17/3681* (2013.01); *G02B 1/115* (2013.01); *G02B 5/0808* (2013.01); *B32B 2255/205* (2013.01); *B32B 2255/28* (2013.01); *B32B 2307/412* (2013.01); *B32B 2419/00* (2013.01); *C03C 2217/281* (2013.01); *C03C 2217/73* (2013.01); *C03C 2218/15* (2013.01); *C03C 2218/322* (2013.01)

(58) Field of Classification Search
CPC ............ C03C 17/3642; C03C 17/3644; C03C 17/3649; C03C 17/3681; B32B 3/08; B32B 17/06; B32B 2255/205; B32B 2255/28; B32B 2307/412; B02B 1/115; B02B 5/0808

USPC ....................................................... 359/359
See application file for complete search history.

(56) References Cited

U.S. PATENT DOCUMENTS

| | | |
|---|---|---|
| 2009/0197077 A1 | 8/2009 | Reutler et al. |
| 2011/0070417 A1 | 3/2011 | Reutler et al. |
| 2012/0028009 A1 | 2/2012 | Gerardin et al. |
| 2014/0191212 A1* | 7/2014 | Lienhart ............ H01L 51/5215 257/40 |
| 2015/0083468 A1* | 3/2015 | Domercq ............ H01L 51/5215 174/255 |
| 2015/0247961 A1 | 9/2015 | Jribi et al. |
| 2015/0321951 A1 | 11/2015 | Alzate et al. |

FOREIGN PATENT DOCUMENTS

| | | |
|---|---|---|
| WO | WO 2010/103224 A1 | 9/2010 |
| WO | WO 2014/044984 A1 | 3/2014 |
| WO | WO 2014/080141 A1 | 5/2014 |

* cited by examiner

SUBSTRATE PROVIDED WITH A STACK HAVING THERMAL PROPERTIES AND A SUBSTOICHIOMETRIC INTERMEDIATE LAYER

CROSS-REFERENCE TO RELATED APPLICATION

The present application is a national stage application of International Patent Application No. PCT/FR2015/052589, filed Sep. 29, 2015, which claims priority to French Patent Application No. 1459256, filed Sep. 30, 2014, the entire contents and disclosure of each of which is incorporated herein by reference.

The invention relates to a multiple glazing comprising at least two substrates, of the glass substrate type, which are held together by a frame structure, said glazing providing a separation between an external space and an internal space, wherein at least one intermediate gas-filled space is positioned between the two substrates.

In a known manner, one of the substrates may be coated on an inner face in contact with the intermediate gas-filled space with a thin-films stack having reflection properties in the infrared and/or in solar radiation comprising a single metallic functional layer, in particular based on silver or on a metal alloy containing silver, and two antireflection coatings, said coatings each comprising at least one dielectric layer, said functional layer being positioned between the two antireflection coatings.

The invention relates more particularly to the use of such substrates for manufacturing thermal insulation and/or solar protection glazing. This glazing may be intended for equipping buildings, especially with a view to reducing air-conditioning load and/or preventing excessive overheating (called "solar control" glazing) and/or reducing the amount of energy dissipated to the outside (called "low-emissivity" glazing) driven by the ever increasing size of glazed surfaces in buildings.

This glazing may furthermore be integrated into glazing having particular functionalities, such as for example heated glazing or electrochromic glazing.

One type of stack known for giving substrates such properties comprises a metallic functional layer having reflection properties in the infrared and/or in solar radiation, in particular a metallic functional layer, based on silver or on a metal alloy containing silver.

In this type of stack, the functional layer is thus positioned between two antireflection coatings each comprising, in general, several layers which are each made of a dielectric material of the nitride type, and in particular silicon nitride or alumina nitride, or of the oxide type. From an optical point of view, the purpose of these coatings which flank the metallic functional layer is to "antireflect" this metallic functional layer.

A blocker coating is however inserted sometimes between one or each antireflection coating and the metallic functional layer; the blocker coating positioned beneath the functional layer in the direction of the substrate protects it during an optional high-temperature heat treatment, of the bending and/or tempering type, and the blocker coating positioned on the functional layer on the opposite side from the substrate protects this layer from any degradation during the deposition of the upper antireflection coating and during an optional high-temperature heat treatment, of the bending and/or tempering type.

The invention relates more particularly to the use of an intermediate layer within the stack, and to the implementation of a treatment of the complete thin-films stack using a source that produces radiation, and in particular infrared radiation.

It is known, in particular from international patent application WO 2010/142926, to provide an absorbent intermediate layer of a stack and to apply a treatment after the deposition of a stack in order to reduce the emissivity, or to improve the optical properties, of low-emissivity stacks. The treatment makes it possible to improve the quality of the metallic functional layer and therefore to reduce the emissivity (which is directly linked to the sheet resistance) and the use of an absorbent intermediate layer makes it possible to increase the absorption of the stack during the treatment so that it is short but effective. As the absorbent intermediate layer becomes transparent during the treatment, the optical characteristics of the stack after treatment are advantageous (a high light transmission may in particular be obtained).

However, this solution is not completely satisfactory for certain applications since it is sometimes necessary for the power of the treatment to be high and/or for it to last a relatively long time (i.e. for the speed of the substrate that passes under the generally stationary source of radiation to be slow).

A thin-films stack with a single functional layer in which the antireflection coating subjacent to the functional layer comprises a non-crystallized smoothing dielectric layer made of a mixed oxide, and preferably made of a mixed zinc tin oxide, is also known in the prior art from international patent application WO 2007/101964.

As this layer is dielectric, this means that it is desired for the material to be sufficiently oxidized so as not to be absorbent.

The objective of the invention is to succeed in overcoming the drawbacks of the prior art, by developing a novel type of stack with a single functional layer, which stack has, after treatment, a low sheet resistance (and therefore a low emissivity), a high light transmission and so that the treatment can be carried out at a lower power and/or at a higher speed.

Thus, one subject of the invention is, in its broadest sense, a substrate coated on one face with a thin-films stack having reflection properties in the infrared and/or in solar radiation as claimed in claim 1. This stack comprises a single metallic functional layer, in particular based on silver or on a metal alloy containing silver, and two antireflection coatings, said coatings each comprising at least one dielectric layer, said functional layer being positioned between the two antireflection coatings.

According to the invention, at least one of said antireflection coatings comprises an intermediate layer comprising zinc tin oxide $Sn_xZn_yO_z$ with a ratio of $0.1 \leq x/y \leq 2.4$, with $0.75(2x+y) \leq z \leq 0.95(2x+y)$ and has a physical thickness of between 2 nm and 25 nm, or even between 2 nm and 12 nm.

The intermediate layer thus comprises a substoichiometric mixed zinc tin oxide and this mixed oxide is absorbent.

Within the meaning of the invention, the fact that the intermediate layer comprises an oxide of zinc and tin means that these two elements represent from 98 to 100% by weight of the metallic elements of the layer, i.e. 98 to 100% by weight of the metallic elements of the metallic target if a metallic target is used for depositing the intermediate layer; it is not excluded for the layer to comprise one or more metallic elements, such as for example aluminum and/or antimony, as a dopant for improving the conduction of the target, or as an impurity.

Indeed, it was discovered that such a layer comprising $Sn_xZn_yO_z$ and that is substoichiometric requires a smaller supply of oxygen than a metallic layer in order to be fully oxidized and that the rise in absorption that it induced before the treatment disappears with the treatment. This oxygen is supplied to it during the treatment by one or two adjacent dielectric layers and/or by the oxygen present in the atmosphere of the treatment.

Thus, the power required in order for the treatment to produce a rise in temperature of the intermediate layer may be divided by a factor of 1.5 to 3; alternatively or in combination, the treatment speed may be increased by a factor of 1.2 to 2.5 in order to increase the productivity.

After treatment, the stack has the properties of a stack that has undergone a high-temperature bending, tempering or annealing heat treatment, all the oxide layers of which exhibit their stable stoichiometry, but the substrate does not exhibit the condition of a substrate that has undergone a high-temperature bending, tempering or annealing heat treatment.

Said intermediate layer according to the invention is not a terminal layer of the stack, i.e. is not the layer of the stack which is furthest from said face of the substrate on which the stack is located.

The term "coating" should be understood in the present invention to mean that there may be a single layer or several layers of different materials within the coating.

As is customary, the term "dielectric layer" should be understood in the present invention to mean that, from the point of view of its nature, the material of the layer is "nonmetallic", i.e. is not a metal. In the context of the invention, this term denotes a material having an n/k ratio over the entire visible wavelength range (from 380 nm to 780 nm) equal to or greater than 5.

The term "absorbent layer" should be understood in the present invention to mean that the layer is a material having a mean k coefficient, over the entire visible wavelength range (from 380 nm to 780 nm), of greater than 0.5 and having a bulk electrical resistivity (as known from the literature) of greater than $10^{-5}$ Ω.cm.

It is recalled that n denotes the real refractive index of the material at a given wavelength and the k coefficient represents the imaginary part of the refractive index at a given wavelength, the n/k ratio being calculated at the same given wavelength for both n and k.

The intermediate layer according to the invention is an absorbent layer within the meaning above.

The refractive index values indicated in the present document are the values measured as is customary at the wavelength of 550 nm.

The expression "layer based on . . . " should be understood in the present invention to mean that the layer comprises the material mentioned at more than 50 at %.

In one particular version of the invention, said intermediate layer comprises zinc tin oxide $Sn_xZn_yO_z$ with a ratio of $0.55 \le x/y \le 0.83$.

In one particular version, said intermediate layer consists of zinc tin oxide $Sn_xZn_yO_z$ and does not comprise any other element.

Said intermediate layer is preferably located in said antireflection coating positioned beneath said metallic functional layer, in the direction of the substrate, directly on a nitride-based dielectric layer and directly under a wetting layer comprising zinc oxide, said nitride-based dielectric layer preferably having a physical thickness of between 10 and 50 nm, and preferably being based on silicon nitride $Si_3N_4$.

Alternatively or in combination, said intermediate layer may be located in the antireflection coating superjacent to the functional layer, on the opposite side from the substrate, preferably directly on an overblocker coating located directly on said functional layer.

The physical thickness of said metallic functional layer is preferably between 6 nm and 16 nm, inclusive of these values, and aims to achieve an emissivity of less than 5%.

In another particular version of the invention, the functional layer is deposited directly on an underblocker coating positioned between the functional layer and the dielectric coating subjacent to the functional layer and/or the functional layer is deposited directly beneath an overblocker coating positioned between the functional layer and the dielectric coating superjacent to the functional layer and the underblocker coating and/or the overblocker coating comprises a thin layer based on nickel or titanium having a physical thickness e' such that $0.2 \text{ nm} \le e' \le 2.5 \text{ nm}$.

In another particular version of the invention, the last layer of the subjacent dielectric coating, the one furthest from the substrate, is based on oxide, deposited preferably substoichiometrically, and in particular is based on titanium oxide ($TiO_x$).

The stack may thus comprise a final layer ("overcoat"), i.e. a protective layer, deposited preferably substoichiometrically. This layer is oxidized for the most part stoichiometrically in the stack after the deposition.

The invention also relates to a process for obtaining a substrate coated on one face with a thin-films stack having reflection properties in the infrared and/or in solar radiation according to the invention comprising a single metallic functional layer, in particular based on silver or on a metal alloy containing silver, and two antireflection coatings, comprising the following steps, in the order:

the deposition on one face of said substrate of a thin-films stack having reflection properties in the infrared and/or in solar radiation according to the invention comprising a single metallic functional layer, in particular based on silver or on a metal alloy containing silver, and two antireflection coatings, then the treatment of said thin-films stack using a source that produces radiation and in particular infrared radiation in an atmosphere preferably comprising oxygen.

It is also possible to make provision for the use of a layer according to the invention comprising zinc tin oxide $Sn_xZn_yO_z$ with a ratio of $0.1 \le x/y 2.4$, with $0.75(2x+y) \le z \le 0.95(2x+y)$ and having a physical thickness of between 2 nm and 25 nm, or even between 2 nm and 12 nm as intermediate layer of a thin-films stack having reflection properties in the infrared and/or in solar radiation according to the invention comprising a single metallic functional layer, in particular based on silver or on a metal alloy containing silver, and two antireflection coatings.

The invention also relates to a multiple glazing comprising at least two substrates which are held together by a frame structure, said glazing providing a separation between an external space and an internal space, wherein at least one intermediate gas-filled space is positioned between the two substrates, one substrate being according to the invention.

Preferably, a single substrate of the multiple glazing comprising at least two substrates or of the multiple glazing comprising at least three substrates is coated on an inner face in contact with the intermediate gas-filled space with a thin-films stack having reflection properties in the infrared and/or in solar radiation.

The glazing according to the invention incorporates at least the substrate bearing the stack according to the invention, optionally combined with at least one other substrate. Each substrate may be clear or tinted. One of the substrates at least may in particular be made of bulk-tinted glass. The choice of coloration type will depend on the level of light transmission and/or on the colorimetric appearance that is/are desired for the glazing once its manufacture has been completed.

The glazing according to the invention may have a laminated structure, in particular combining at least two rigid substrates of glass type with at least one sheet of thermoplastic polymer, in order to have a structure of the following type: glass/thin-films stack/ sheet(s)/glass/intermediate gas-filled space/glass sheet. The polymer may in particular be based on polyvinyl butyral PVB, ethylene/vinyl acetate EVA, polyethylene terephthalate PET or polyvinyl chloride PVC.

Advantageously, the present invention thus makes it possible to produce a thin-films stack with a single functional layer having, after treatment using a source that produces radiation, deposited on a transparent substrate, a high light transmission in the visible $T_L$, greater than 80% and a low sheet resistance, of less than 4 ohms per square, the treatment requiring less power and/or being able to be carried out more rapidly.

Advantageously, the treatment with a source of radiation is not a high-temperature heat treatment of the entire assembly consisting of the substrate and the stack; the substrate is not therefore heat-treated by this treatment using a source of radiation (no bending, tempering or annealing).

Figure 2:
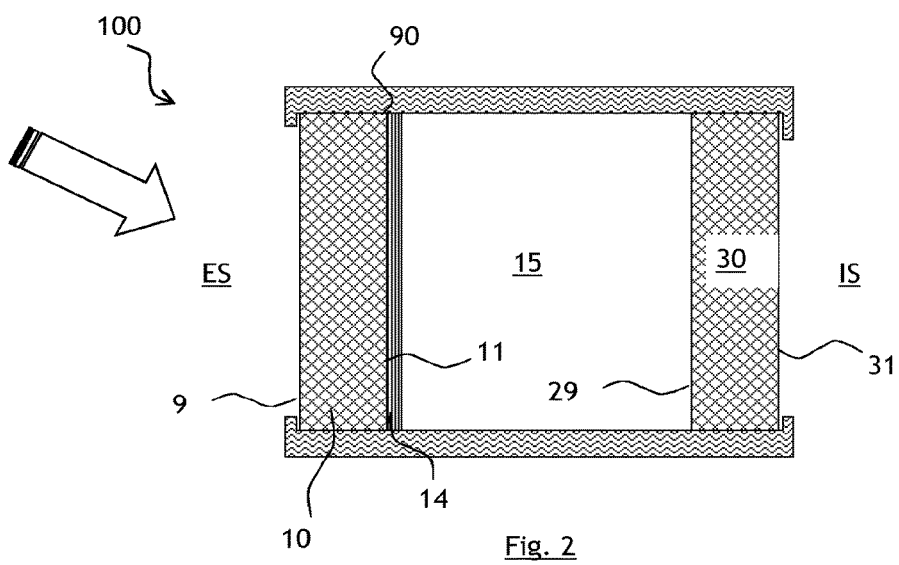

The details and advantageous features of the invention will emerge from the following nonlimiting examples, illustrated by means of the appended figures that illustrate:

in FIG. 1, a stack with a single functional layer according to the invention, the functional layer being deposited directly on an underblocker coating and directly beneath an overblocker coating, the stack being illustrated during the treatment using a source that produces radiation; and in FIG. 2, a double glazing solution incorporating a stack with a single functional layer.

In these figures, the proportions between the thicknesses of the various layers or of the various elements are not rigorously respected in order to make them easier to examine.

FIG. 1 illustrates a structure of a stack 14 with a single functional layer according to the invention deposited on one face 11 of a transparent glass substrate 10, in which the single functional layer 140, in particular based on silver or on a metal alloy containing silver, is deposited between two antireflection coatings, the subjacent antireflection coating 120 located underneath the functional layer 140 in the direction of the substrate 10 and the superjacent antireflection coating 160 positioned on top of the functional layer 140 on the opposite side from the substrate 10.

These two antireflection coatings 120, 160, each comprise at least one dielectric layer 122, 124, 128; 162, 164.

Optionally, on the one hand the functional layer 140 may be deposited directly on an underblocker coating 130 positioned between the subjacent antireflection coating 120 and the functional layer 140 and, on the other hand, the functional layer 140 may be deposited directly beneath an overblocker coating 150 positioned between the functional layer 140 and the superjacent antireflection coating 160.

The underblocker and/or overblocker layers, although deposited in metallic form and presented as being metallic layers, are sometimes in practice oxidized layers since one of their functions, (in particular for the overblocker layer) is to oxidize during the deposition of the stack in order to protect the functional layer.

The antireflection coating 160 located on top of the metallic functional layer is terminated by a terminal layer 168, which is the layer of the stack furthest from the face 11.

When a stack with a single functional layer is used in a multiple glazing 100 of double glazing structure, as illustrated in FIG. 2, this glazing comprises two substrates 10, 30 which are held together by a frame structure 90 and which are separated from one another by an intermediate gas-filled space 15.

The glazing thus provides a separation between an external space ES and an internal space IS.

The stack may be positioned on face 2 (on the sheet furthest to the outside of the building when considering the incident direction of the sunlight entering the building and on its face turned toward the gas-filled space).

FIG. 2 illustrates this positioning (the incident direction of the sunlight entering the building being illustrated by the double arrow) on face 2 of a thin-films stack 14 positioned on an inner face 11 of the substrate 10 in contact with the intermediate gas-filled space 15, the other face 9 of the substrate 10 being in contact with the external space ES.

However, it may also be envisaged that in this double glazing structure, one of the substrates has a laminated structure.

Two examples were carried out on the basis of the stack structure illustrated in FIG. 1.

For these two examples, the antireflection coating 120 subjacent to the functional layer 140 comprises three dielectric layers 122, 124, 128, the layer 122, first layer of the stack and in contact with the face 11, is a layer having an average refractive index; it is made of the nitride $Si_3N_4$:Al and is deposited from a metallic target doped with 8% by weight of aluminum. It has a refractive index of between 1.9 and 2.1, and which here is precisely 2.0.

The second dielectric layer 126 is an intermediate layer which will be described in greater detail below.

The third dielectric layer of the antireflection coating 120 is a wetting layer 128 positioned just beneath the metallic functional layer 140.

In the examples, there is no underblocker coating 130.

For these examples, the antireflection layer 128 is referred to as a "wetting layer" since it makes it possible to improve the crystallization of the metallic functional layer 140 which here is made of silver, which improves its conductivity. This antireflection layer 128 is made of aluminum-doped zinc oxide ZnO:Al (deposited from a metallic target consisting of zinc doped with 2% by weight of aluminum).

In the examples, there is an overblocker coating 150.

The superjacent antireflection coating 160 comprises a dielectric layer 162 made of aluminum-doped zinc oxide ZnO:Al (deposited from a target identical to that used for the wetting layer 128 and under the same conditions), then a dielectric layer 164 having an average index, made of the same material as the dielectric layer 122.

This dielectric coating 160 may be terminated with an optional protective layer 168, in particular based on oxide, especially that is substoichiometric in oxygen.

For all the examples below, the conditions for depositing the layers are:

| Layer | Target used | Deposition pressure | Gas |
|---|---|---|---|
| $Si_3N_4$:Al | Si:Al at 92:8 wt % | $1.5 \times 10^{-3}$ mbar | Ar/(Ar + $N_2$) at 45% |
| $TiO_x$ | $TiO_x$ | $2 \times 10^{-3}$ mbar | Ar/(Ar + $O_2$) at 90% |
| $TiO_2$ | Ti | $2 \times 10^{-3}$ mbar | Ar/(Ar + $O_2$) at 35% |

-continued

| Layer | Target used | Deposition pressure | Gas |
|---|---|---|---|
| Ti | Ti | 7 × 10⁻³ mbar | Ar at 100% |
| ZnO:Al | Zn:Al at 98:2 wt % | 2 × 10⁻³ mbar | Ar/(Ar + O₂) at 52% |
| Sn$_x$Zn$_y$O$_z$ | Sn:Zn:Sb at 30:68:2 wt % | 3 × 10⁻³ mbar | Ar/(Ar + O₂) at 64% |
| Ag | Ag | 2 × 10⁻³ mbar | Ar at 100% |

The layers deposited may thus be classed into four categories:

i— layers made of antireflection/dielectric material, having an n/k ratio over the entire visible wavelength range of greater than 5: Si₃N₄:Al, TiO₂, ZnO:Al ii— intermediate layer made of absorbent material, having a mean k coefficient, over the entire visible wavelength range, of greater than 0.5 and a bulk electrical resistivity which is greater than $10^{-5}$ Ω.cm: TiO$_x$ and Sn$_x$Zn$_y$O$_z$ iii— metallic functional layers made of material having reflection properties in the infrared and/or in solar radiation: Ag iv— underblocker and overblocker layers intended to protect the functional layer against a modification of its nature during the deposition of the stack; their influence on the optical and energy properties is in general ignored.

It was observed that the silver has a ratio 0<n/k<5 over the entire visible wavelength range, but its bulk electrical resistivity is less than $10^{-5}$ Ω.cm.

For both of the examples, the thin-films stack is deposited on a substrate made of clear soda-lime glass having a thickness of 4 mm of the Planilux brand, distributed by SAINT-GOBAIN.

For both of these examples,

ε indicates the normal emissivity, calculated from the sheet resistance R of the stack which is measured in ohms per square, according to the formula: ε=0.0106 R A$_L$ indicates the light absorption in the visible in %, measured at 2° under the D65 illuminant;

A$_{980}$ indicates the absorption measured specifically at the wavelength of 980 nm, in %, measured at 2° under the D65 illuminant;

T$_L$ indicates the light transmission in the visible in %, measured at 2° under the D65 illuminant;

SF indicates the solar factor, i.e. the ratio, in percent, of the total solar energy entering the room through the glazing to the total incident solar energy; this factor is calculated by considering that the substrate bearing the stack is integrated into a double glazing that has the structure: 4-16-4 (Ar-90%), that is to say that two glass substrates, each having a thickness of 4 mm, are separated by a gas-filled space consisting of 90% argon and 10% air having a thickness of 16 mm.

The two examples were carried out according to the stack structure illustrated in FIG. 1, but without underblocker coating 130.

Table 1 below illustrates the geometric or physical thicknesses (and not the optical thicknesses) in nanometers of each of the layers of the two examples:

TABLE 1

| Layer | Material | Ex. 1 | Ex. 2 |
|---|---|---|---|
| 168 | TiO₂ | 2 | 2 |
| 164 | Si₃N₄:Al | 38 | 38 |
| 162 | ZnO:Al | 5 | 5 |

TABLE 1-continued

| Layer | Material | Ex. 1 | Ex. 2 |
|---|---|---|---|
| 150 | Ti | 0.2 | 0.2 |
| 140 | Ag | 8.5 | 8.5 |
| 128 | ZnO:Al | 5 | 5 |
| 126 | | TiO$_x$ 5 | SnZnO$_x$ 6 |
| 122 | Si₃N₄:Al | 18 | 18 |

Table 2 below summarizes the main optical and energy features of these two examples, respectively when only the substrate 10 alone is considered for the emissivity, the two absorptions and the light transmission and when it is assembled as double glazing, on face 2, F2 as in FIG. 2 for the solar factor SF, respectively before treatment (BT) and after treatment (AT).

TABLE 2

| | | A$_l$ (%) | A$_{980}$ (%) | ε (%) | T$_L$ (%) | SF (%) |
|---|---|---|---|---|---|---|
| Ex. 1 | BT | 6.3 | 13.3 | 4.9 | 88.3 | 64.6 |
| | AT | 4.6 | 12.4 | 3.9 | 90 | 64.4 |
| Ex. 2 | BT | 9.6 | 19 | 4.8 | 85.4 | 65.7 |
| | AT | 4.7 | 12.9 | 4 | 90 | 64.8 |

Thus, the optical and energy properties of example 2 according to the invention are substantially identical to that of the reference example 1.

The treatment of the stack consists, for both examples, in passing the stack, after the deposition of all the layers, under a curtain 20 of laser diodes, the diodes being positioned above the stack with reference to FIG. 1 and emitting in the direction of the stack (emission illustrated by the straight black arrow). The diodes emit at the wavelength of 980 nm, each diode emitting over a length of 12 mm and a width of 45 μm.

However, for example 1, the run speed of the substrate coated with the complete stack is 11 m/minute whereas for example 2 it is 22 m/minute.

It is particularly surprising that an intermediate layer located in said dielectric coating 120 positioned underneath said metallic functional layer 140 can be "re-oxidized" by the subsequent treatment of the complete stack using a source that produces radiation and in particular infrared radiation.

When this intermediate layer is, as in the case of the example above, directly on a nitride-based dielectric layer having a physical thickness of between 10 and 50 nm and directly beneath a wetting layer comprising zinc oxide, then this intermediate layer may also have a smoothing effect, such as that disclosed in international patent application WO 2007/101964.

An intermediate layer deposited from a target made of Sn:Zn at 56.5:43.5 wt % was also tested and gave similar results.

It is important to note that the intermediate layer according to the invention may be deposited from a ceramic target that comprises the oxygen necessary for achieving the targeted oxygen stoichiometry and in an oxygen-free atmosphere, or may be deposited from a metallic target that does not comprise all the oxygen necessary for achieving the targeted oxygen stoichiometry and in an oxygen-containing atmosphere.

The present invention is described in the preceding text by way of example. It will be understood that a person skilled in the art will be able to realize different variants of the invention without otherwise departing from the scope of the patent as defined by the claims.

The invention claimed is:

1. A substrate coated on one face with a thin-films stack having reflection properties in the infrared and/or in solar radiation comprising a single metallic functional layer and two antireflection coatings, said coatings each comprising at least one dielectric layer, said functional layer being positioned between the two antireflection coatings wherein at least one of said antireflection coatings comprises an intermediate layer, which is an absorbent layer comprising zinc tin oxide $Sn_xZn_yO_z$ with a ratio of $0.1 \leq x/y \leq 2.4$ with $0.75(2x+y) \leq z \leq 0.95(2x+y)$, and having a physical thickness of between 2 nm and 25 nm.

2. The substrate as claimed in claim 1, wherein said intermediate layer comprises zinc tin oxide $Sn_xZn_yO_z$ with a ratio of $0.55 \leq x/y \leq 0.83$.

3. The substrate as claimed in claim 1, wherein said intermediate layer is located in said dielectric coating positioned beneath said metallic functional layer, directly on a nitride-based dielectric layer and directly under a wetting layer comprising zinc oxide.

4. The substrate as claimed in claim 1, therein said intermediate layer is located in the antireflection coating superjacent to the functional layer.

5. A multiple glazing comprising:
at least two substrates which are held together by a frame structure, said glazing providing a separation between an external space and an internal space, wherein at least one intermediate gas-filled space is positioned between the two substrates, one of the two substrates being the substrate as claimed in claim 1.

6. A process for obtaining a substrate coated on one face with a thin-films stack having reflection properties in the infrared and/or in solar radiation comprising a single metallic functional layer and two antireflection coatings the process comprising the following steps, in order:
depositing on one face of said substrate the thin-films stack having reflection properties in the infrared and/or in solar radiation comprising the single metallic functional layer and the two antireflection coatings to form the substrate as claimed in claim 1,
treating said thin-films stack using a source that produces radiation in an atmosphere.

7. The substrate as claimed in claim wherein the single metallic functional layer is based on silver or on a metal alloy containing silver.

8. The substrate claimed in claim 1, wherein the physical thickness is between 2 nm and 12 nm.

9. The substrate as claimed in claim 3, wherein said nitride-based dielectric layer having a physical thickness of between 10 and 50 nm.

10. The substrate as claimed in claim 9, wherein said nitride-based dielectric layer is based on silicon nitride $Si_3N_4$.

11. The substrate as claimed in claim 3, wherein said nitride-based dielectric layer is based on silicon nitride $Si_3N_4$.

12. The substrate as claimed in claim 4, wherein said intermediate layer is located directly on an overblocker coating located directly on said functional layer.

13. A multiple glazing comprising:
at least two substrates which are held together by a frame structure, said glazing providing a separation between an external space and an internal space, wherein at least one intermediate gas-filled space is positioned between the two substrates, one of the two substrates being the substrate as claimed in claim 2.

14. A multiple glazing comprising:
at least two substrates which are held together by a frame structure, said glazing providing a separation between an external space and an internal space, wherein at least one intermediate gas-filled space is positioned between the two substrates, one of the two substrates being the substrate as claimed in claim 3.

15. A multiple glazing comprising:
at least two substrates which are held together by a frame structure, said glazing providing a separation between an external space and an internal space, wherein at least one intermediate gas-filled space is positioned between the two substrates, one of the two substrates being the substrate as claimed in claim 4.

16. The process as claimed in claim 6, wherein the single metallic functional layer is based on silver or on a metal alloy containing silver.

17. The process as claimed in claim 6, wherein the radiation produced in the treating is infrared radiation.

18. The process as claimed in claim 17, wherein the atmosphere in the treating comprises oxygen.

19. The process as claimed in claim 6, wherein the atmosphere in the treating comprises oxygen.

20. A substrate coated on one face with a thin-films stack having reflection properties in the infrared and/or in solar radiation comprising a single metallic functional layer and two antireflection coatings, said coatings each comprising at least one dielectric layer, said functional layer being positioned between the two antireflection coatings, wherein at least one of said antireflection coatings comprises an intermediate layer comprising zinc tin oxide $Sn_xZn_yO_z$ with a ratio of $0.1 \leq x/y \leq 2.4$, with $0.75(2x+y) \leq z \leq 0.95(2x+y)$, and having a physical thickness of between 2 nm and 25 nm, and wherein the intermediate layer is not a dielectric layer.

* * * * *